(12) United States Patent
Kardos

(10) Patent No.: US 10,760,553 B2
(45) Date of Patent: Sep. 1, 2020

(54) ELECTROMAGNETIC ENERGY BEAM ANGULAR MOMENTUM ENGINE: SELF-PROPULSION OF ENERGY BEAM SOURCE VIA APPLICATION OF CONSERVATION OF ANGULAR MOMENTUM

(71) Applicant: Stephen Kardos, Ossining, NY (US)

(72) Inventor: Stephen Kardos, Ossining, NY (US)

(*) Notice: Subject to any disclaimer, the term of this patent is extended or adjusted under 35 U.S.C. 154(b) by 297 days.

(21) Appl. No.: 15/869,850

(22) Filed: Jan. 12, 2018

(65) Prior Publication Data

US 2018/0195499 A1 Jul. 12, 2018

Related U.S. Application Data

(60) Provisional application No. 62/445,466, filed on Jan. 12, 2017.

(51) Int. Cl.
| | |
|---|---|
| *F03H 3/00* | (2006.01) |
| *B64G 1/40* | (2006.01) |
| *G02B 6/42* | (2006.01) |
| *G02B 26/08* | (2006.01) |
| *G02B 27/10* | (2006.01) |

(52) U.S. Cl.
CPC .............. *F03H 3/00* (2013.01); *B64G 1/409* (2013.01); *G02B 6/4206* (2013.01); *G02B 6/4296* (2013.01); *G02B 26/08* (2013.01); *G02B 26/0816* (2013.01); *G02B 27/106* (2013.01)

(58) Field of Classification Search
CPC .................................. F03H 3/00; B64G 1/409
See application file for complete search history.

(56) References Cited

U.S. PATENT DOCUMENTS

| | | | |
|---|---|---|---|
| 2007/0045474 A1* | 3/2007 | Bae | B64G 1/1085 244/171.1 |
| 2008/0197238 A1* | 8/2008 | Bae | B64G 1/405 244/171.1 |

* cited by examiner

*Primary Examiner* — Gerald L Sung
*Assistant Examiner* — William L Breazeal
(74) *Attorney, Agent, or Firm* — Leason Ellis LLP

(57) ABSTRACT

The present application relates to optical-mechanical systems and methods for moving a solid object by applying conservation of angular momentum to a configuration of a laser light beam that emanates from the solid object. The system includes a rotatable housing and an axially movable laser light source coupled to the housing and configured to emit a first light beam along a first path. The system can include a first beam splitter disposed along the first path for splitting the first light beam into a second light beam and a third light beam. The system can cause the third light beam to travel in a closed path, as an approximation of a circular path of initial radius, and of decreasing radius. The system can further include a second beam splitter, axially movable first, second and third mirrors, and a third beam splitter disposed at one end of the housing.

16 Claims, 9 Drawing Sheets

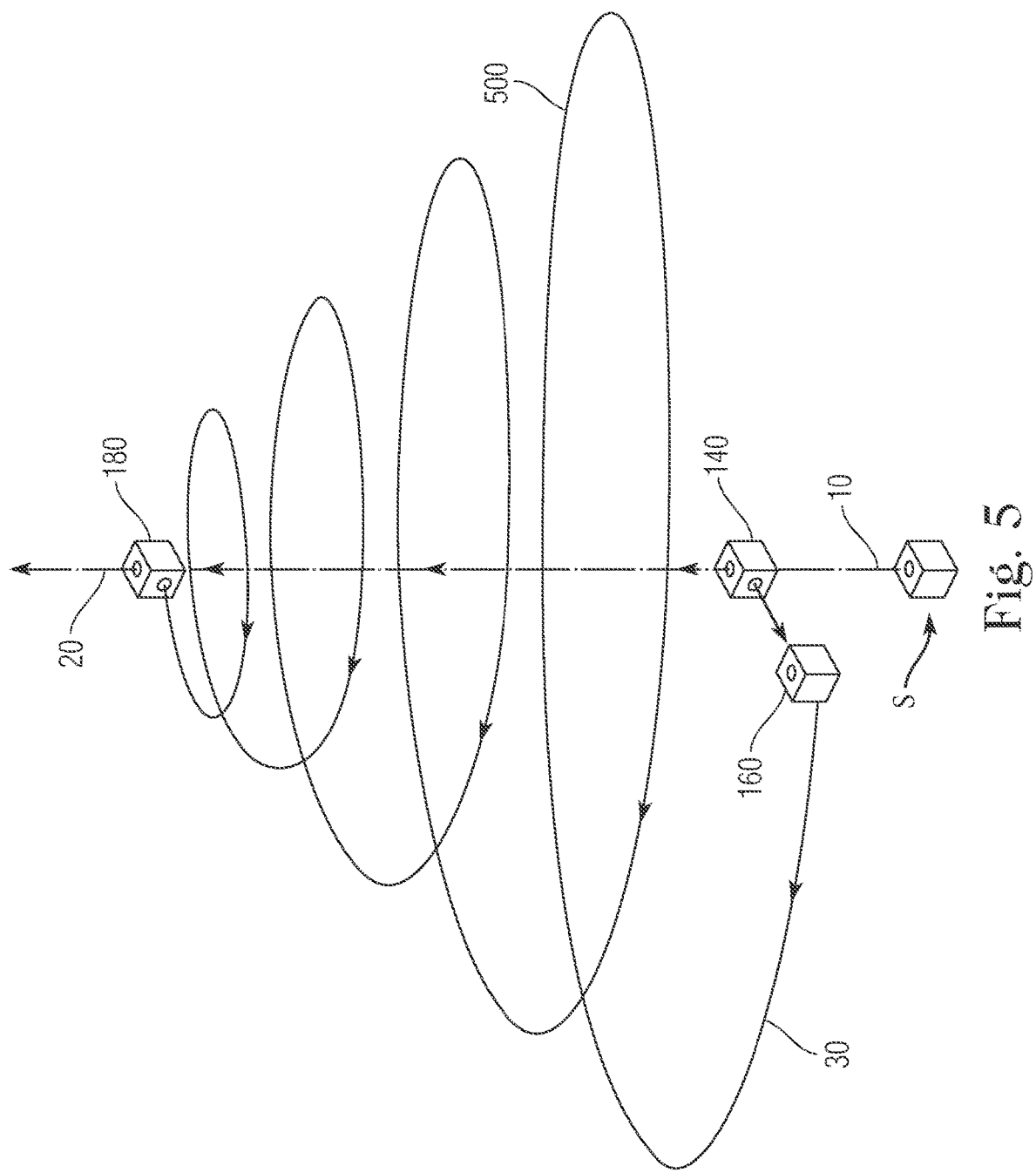

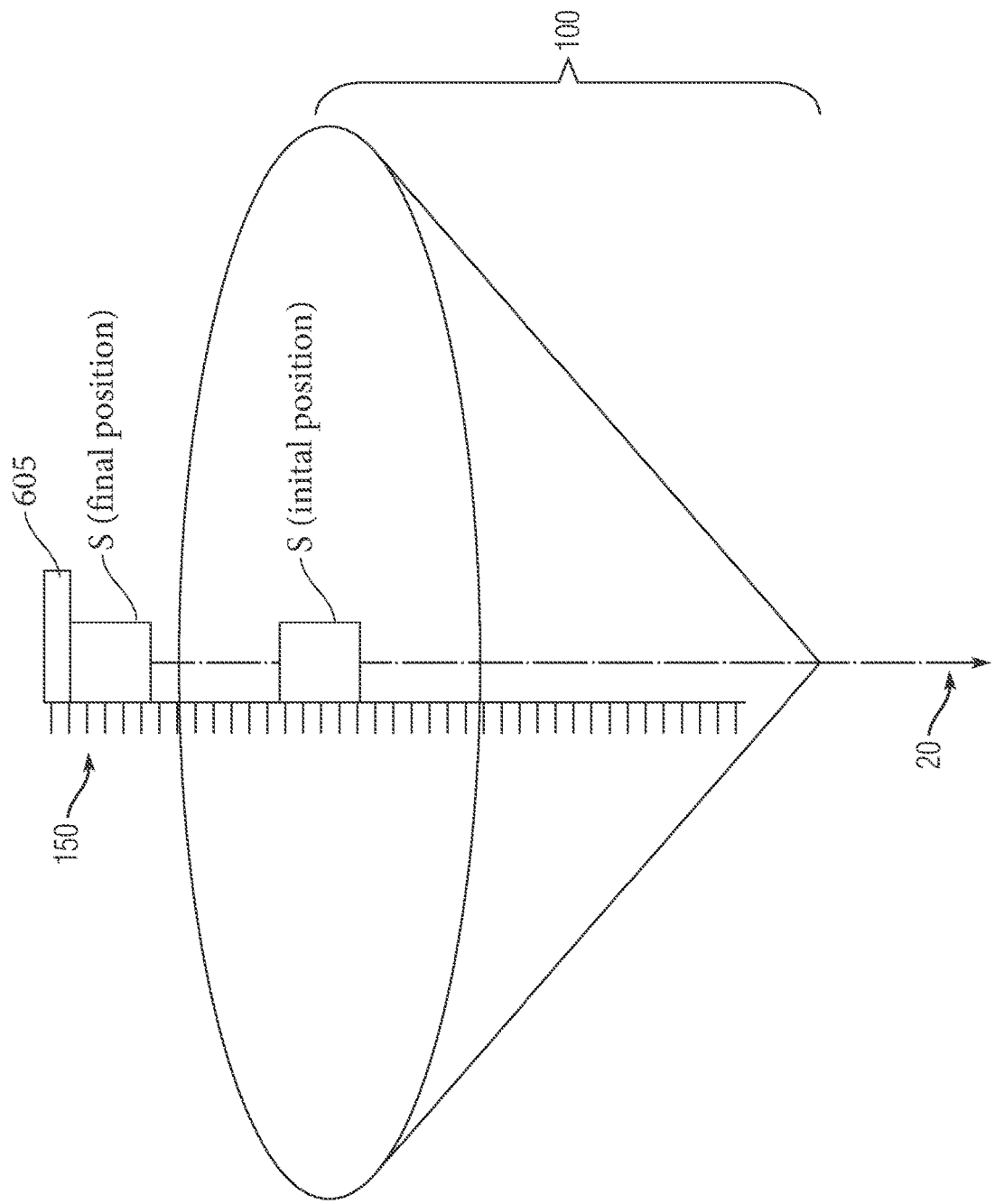

ELECTROMAGNETIC ENERGY BEAM ANGULAR MOMENTUM ENGINE: SELF-PROPULSION OF ENERGY BEAM SOURCE VIA APPLICATION OF CONSERVATION OF ANGULAR MOMENTUM

CROSS-REFERENCE TO RELATED APPLICATION

The present application claims priority to U.S. patent application Ser. No. 62/445,466, filed on Jan. 12, 2017, which is hereby incorporated by reference in its entirety.

TECHNICAL FIELD

The present application relates to systems and methods for propulsion of an object, and more particularly, systems and methods for propulsion of an object via an energy beam.

BACKGROUND

There are variety of different motive force technologies for propelling objects (e.g., ground vehicles, aerial transport vehicles), such as combustion engines, electric motors, and the like. However, each of the current conventional technologies are limited based on the future availability of the fuel needed to operate such technology. Accordingly, there is a need for additional motive force technologies for propelling vehicles.

SUMMARY

Methods and systems are disclosed, which demonstrate that the source of an energy laser light beam (beam) can undergo induced translational motion when its beam is split, undergoes rotational motion, is forced to travel in shrinking closed orbits, and is then recombined under specific circumstances in a special optical-mechanical system.

In one aspect, the present application discloses an optical-mechanical system that comprises a rotatable housing, and an axially movable high energy laser light source coupled to the housing and configured to emit a first light beam along a first path. The system further comprises an axially movable first beam splitter disposed along the first path for splitting the first light beam into a second light beam and a third light beam. The system also comprises a means for causing the third light beam to travel in a closed, equilateral triangular path, as an approximation of a circular path of initial radius, and of decreasing radius. The means can comprise an axially movable second beam splitter, and axially movable first, second and third mirrors that are configured to move in synchrony with the second beam splitter. The first, second and third mirrors can be arranged to define an equilateral triangle. The means further includes a third beam splitter disposed at one end of the rotatable housing and configured to recombine the second light beam with the third light beam after the first beam splitter travels a predefined axial distance corresponding to a shrunken orbit of desired radius.

In another aspect, the present application discloses a method of controlled self-propulsion of a laser energy beam source by no mechanical means but instead by a specific configuration of the laser beam energy beam that emanates from an energy beam source via application of conservation of angular momentum. In the method, a housing associated with an optical-mechanical system is rotated, the housing including the energy beam source that emits a first light beam. The first light beam is split using a first beam splitter into a second light beam and a third light beam, the first beam splitter being axially movable along a first axis. An axially movable first optical arrangement is used to direct the third light beam to travel in a closed, equilateral triangular path that approximates a circular orbit defined by a radius. The axially movable optic arrangement can include a second beam splitter and first, second and third mirrors. The third light beam is then caused to travel in shrinking closed orbits defined by closed, equilateral paths. After reaching a desired final radius which is less than an initial radius, the third beam is recombined with the second beam by redirecting the third beam to the second beam with a fixed second optical arrangement, which can include third and fourth mirrors and a third beam splitter.

These and other aspects and features of the present application shall be understood from the following discussion of certain embodiments of the invention.

BRIEF DESCRIPTION OF THE DRAWING FIGURES

Figures 2A, 2B:
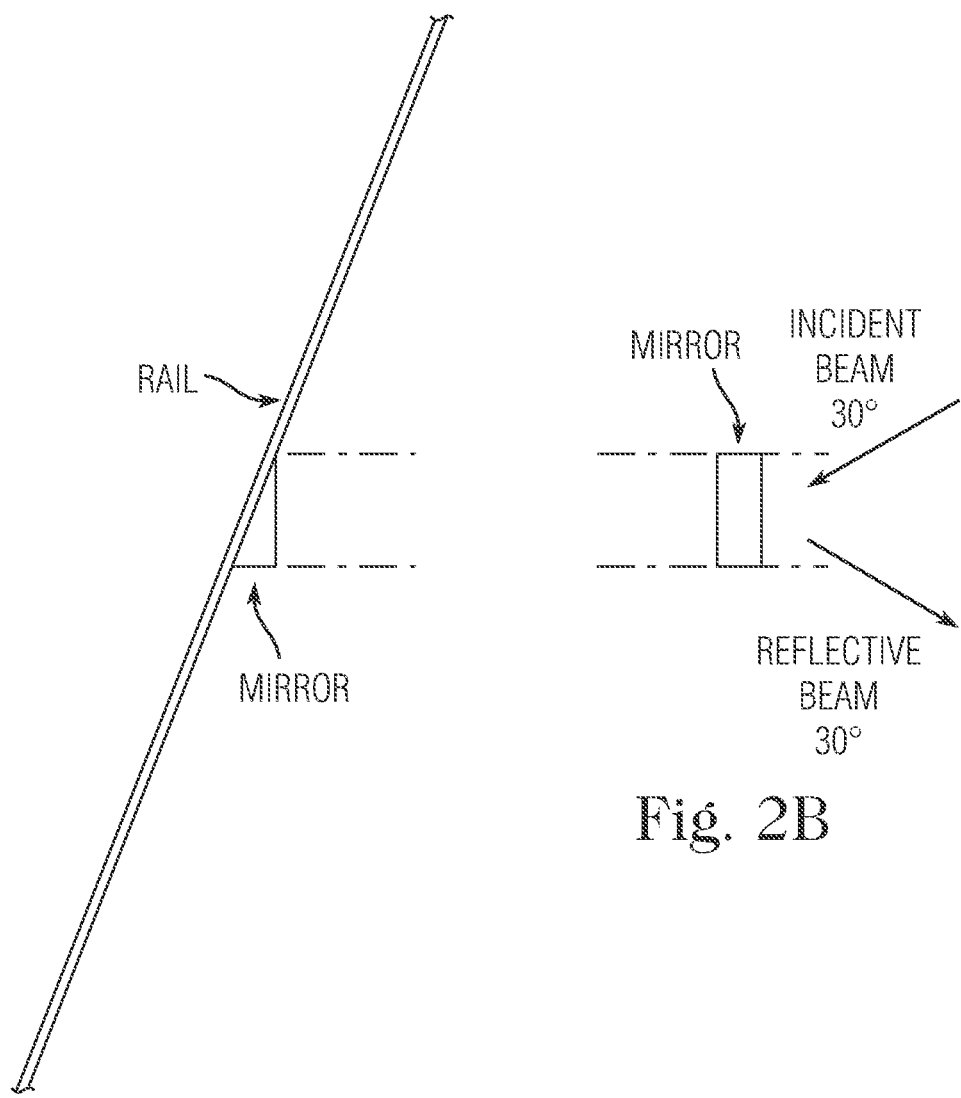
Figure 3A:
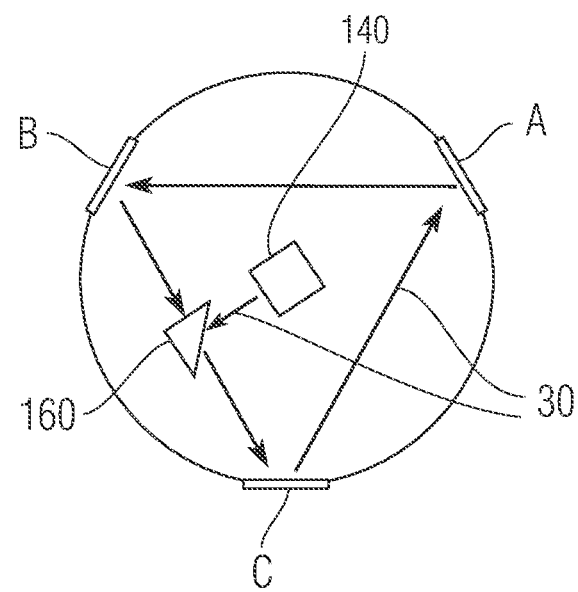
Figure 3B:
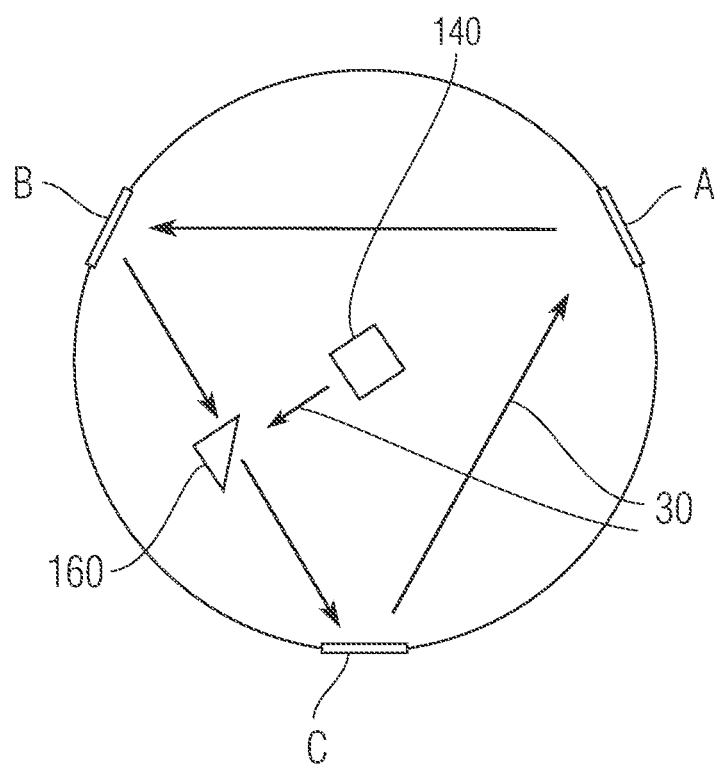
Figure 4B:
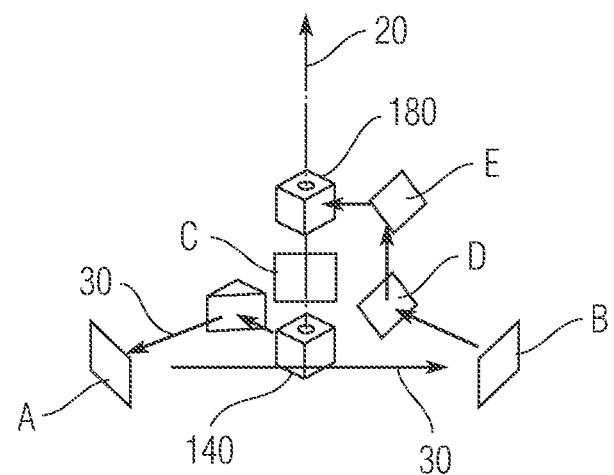
Figure 4A:
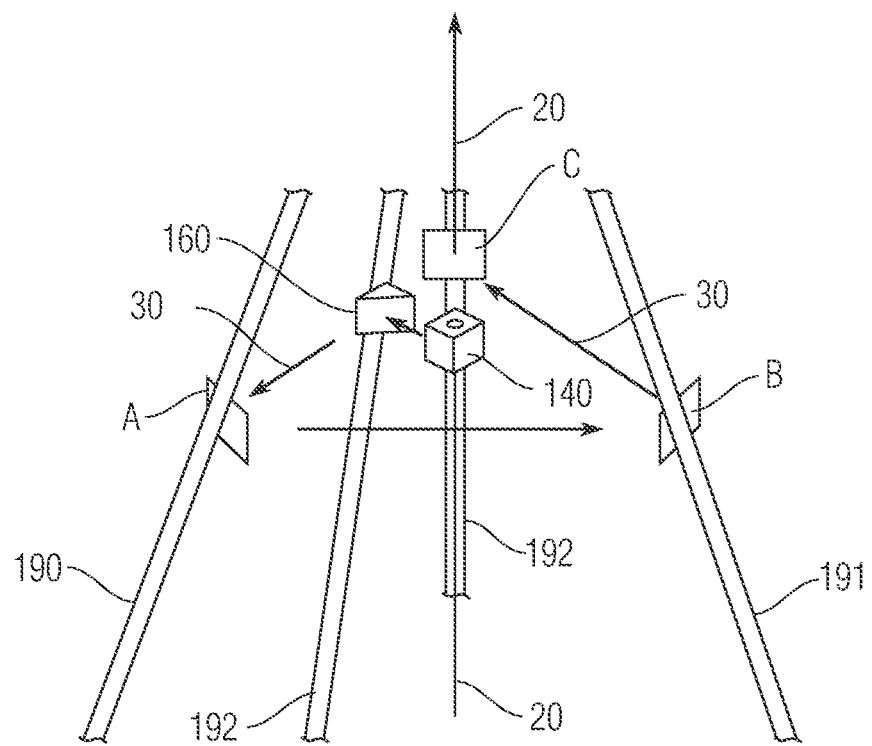

FIGS. 2A-2B: FIG. 2A shows the positioning of one of the mirrors on a respective rail of the optical-mechanical system, and FIG. 2B shows the operation of the mirror and in particular shows an incident beam striking the mirror and then being reflected as a reflected beam, in accordance with one or more embodiments;

FIGS. 3A-3B: FIG. 3A shows a closed triangular path of the energy beam path having a small radius, while FIG. 3B shows a closed triangular path of the energy beam having a large radius, in accordance with one or more embodiments;

FIGS. 4A-4B: FIG. 4A shows a near-final radius of the energy beam of the system, which is realized prior to the final radius shown in FIG. 4B, in accordance with one or more embodiments;

FIG. 5 shows an exemplary implementation of the system featuring a fiber optic cable, in accordance with one or more embodiments.

Figure 7:
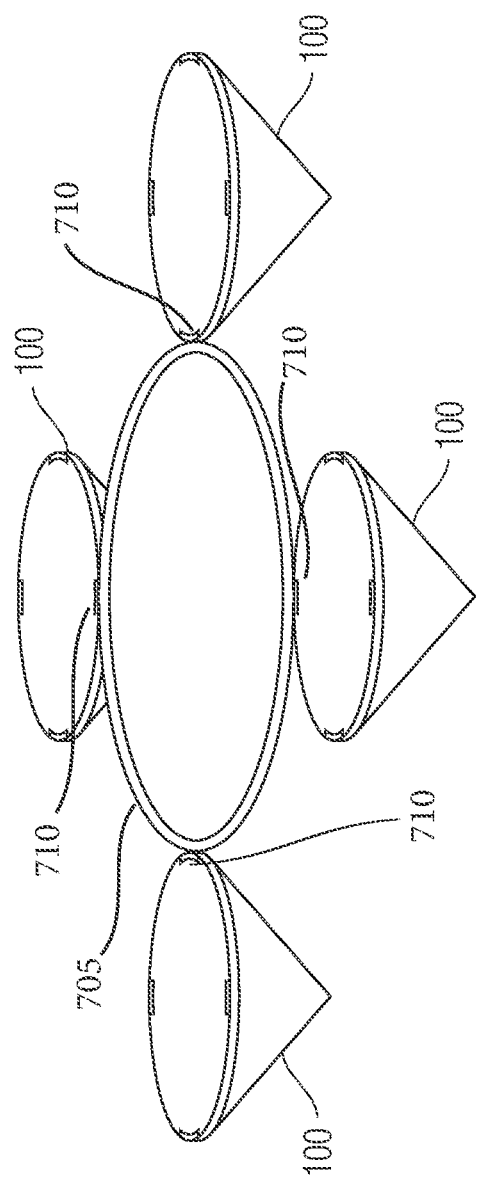

FIG. 6 illustrates the approximate cone shape of the system in accordance with one or more embodiments; and FIG. 7 illustrates a group of optical-mechanical systems in a circular arrangement in accordance with one or more embodiments.

DETAILED DESCRIPTION OF CERTAIN EMBODIMENTS

By way of overview and introduction, the present application relates to optical-mechanical systems and methods for moving a solid object in a controlled fashion by applying conservation of angular momentum to a special configuration of a laser light beam that emanates from the solid object. No combustion engine or electric motor is needed for the propulsion of the solid object. The speed at which the solid object is moved can be orders of magnitude greater than speeds achievable by current propulsion technologies (e.g., combustion engines, electric motors), and can be adjusted by varying a ratio of the radius of an initial orbit of the laser light to the radius of the final orbit of laser light.

More specifically, in the present systems and methods, conservation of angular momentum is applied to a continuous, coherent high energy (laser light) beam traveling in shrinking closed orbits via a special optical-mechanical system in order to induce controlled linear motion of the source of the continuous, coherent high energy (laser light) beam. When a rotating figure skater pulls his arms and legs in, rotational inertia decreases and rotational speed increases in order to maintain conservation of angular momentum. Similarly, in the present systems and methods, the high energy (laser light) beam traveling in smaller and smaller closed orbits is subject to the same rotational inertia and speed dynamics as the rotating skater. However, since the speed of light is fixed, the high energy (laser light) beam source and high energy (laser light) beam, two components behaving as one, as a system, must increase speed in order to preserve conservation of angular momentum. As a result, the high energy laser light beam source component of the source-plus-high energy (laser light) beam system must undergo lateral movement. Provided the high energy laser light beam remains continuous and the closed orbits are continuously reduced in size, the source component must move, in order conserve angular momentum, and in the opposite direction of the high energy (laser light) beam. The ability to induce motion of the continuous, coherent high energy (laser light) beam source, via a directed continuous coherent energy beam subject to and demonstrating the effects of conservation of angular momentum, has broad practical and commercial applications for various propulsion systems.

Figure 1A:
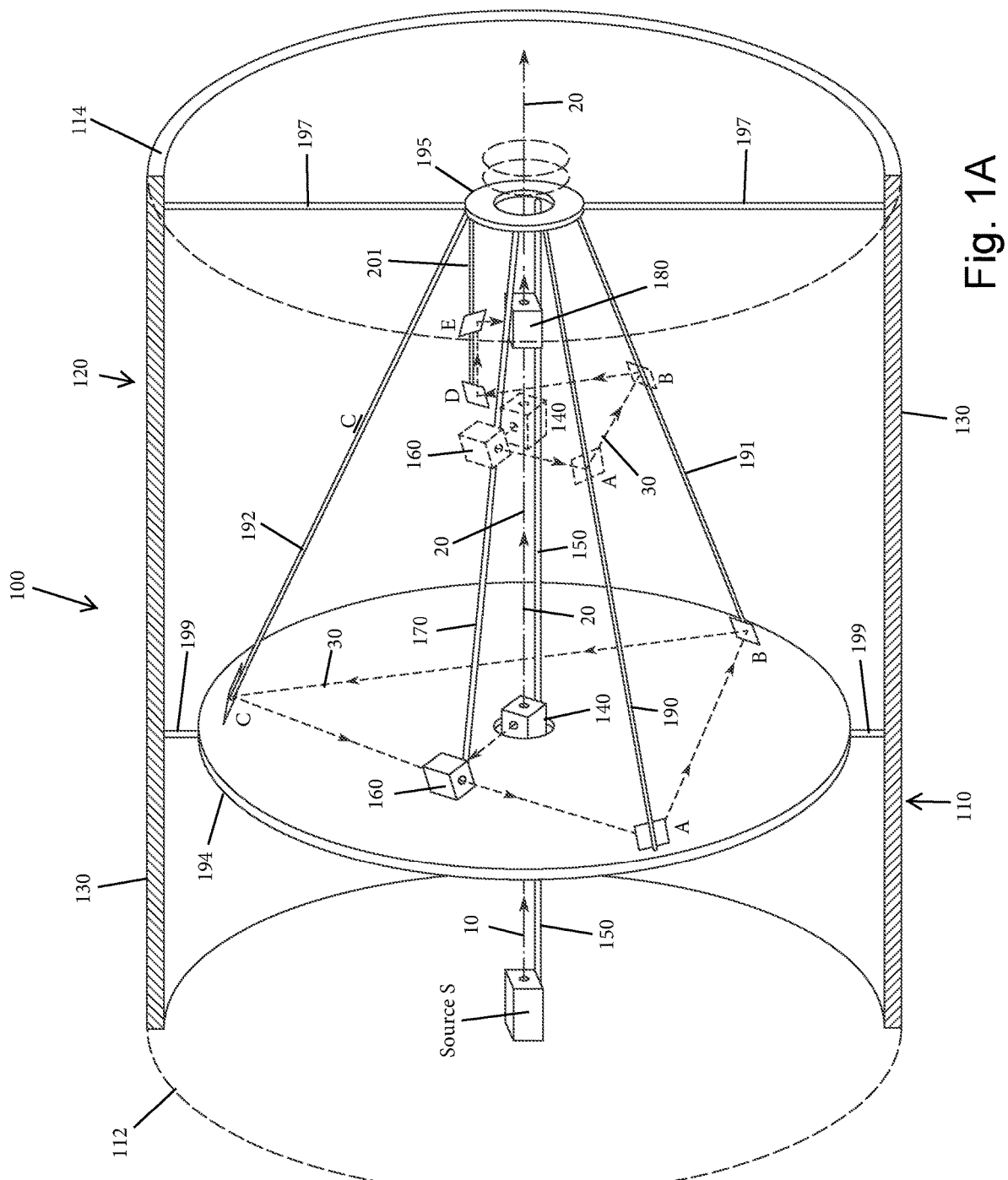
FIGS. 1A-1B illustrate an exemplary optical-mechanical system in accordance with one or more embodiments.
Figure 1B:
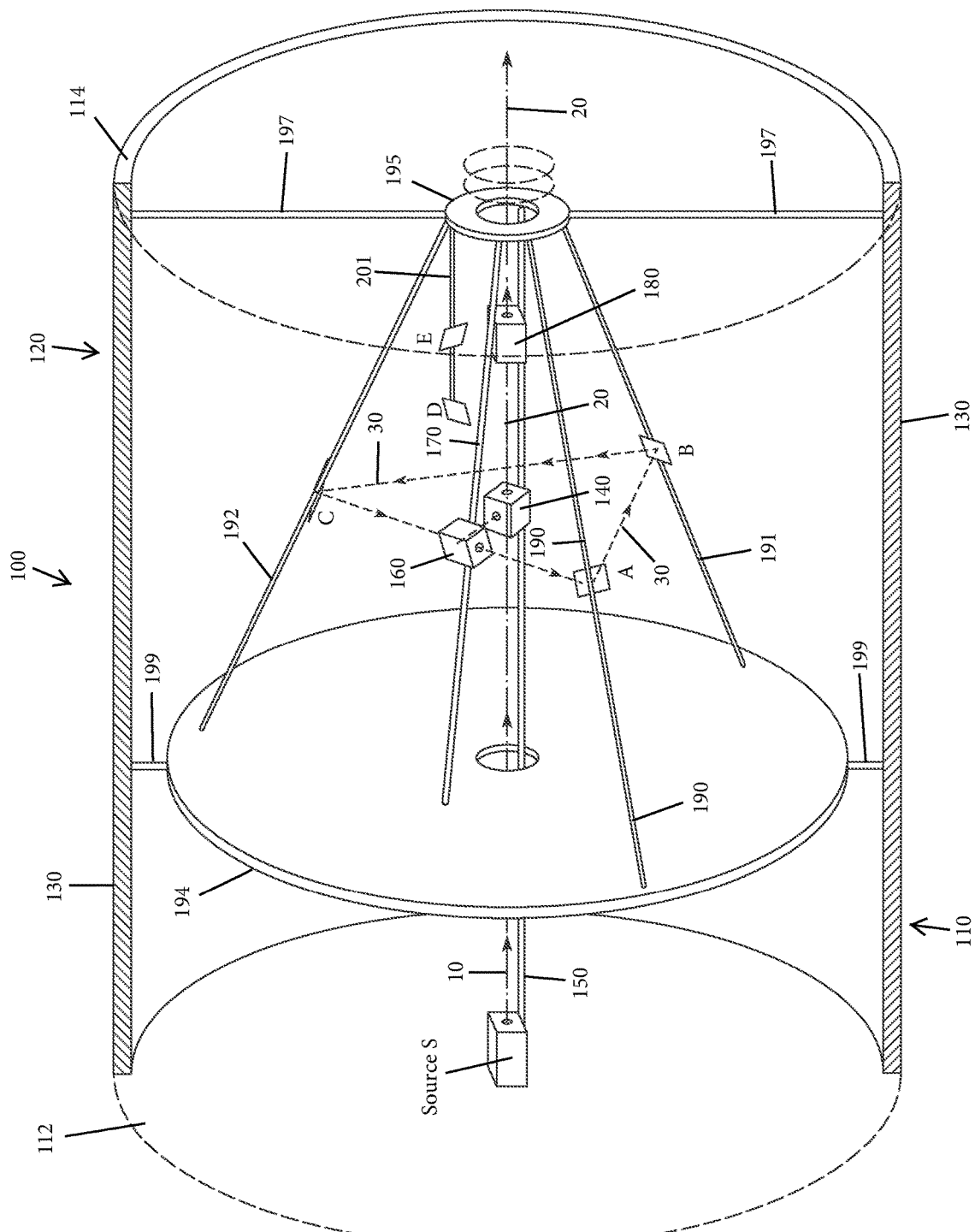

FIGS. 1A-1B illustrate an exemplary optical-mechanical system 100 in accordance with one or more embodiments of the present invention. As described herein, the optical-mechanical system 100 includes a number of components that are arranged to achieve the objectives and results described herein. FIG. A shows the optical-mechanical system 100 in various operating positions, while FIG. 1B shows the optical-mechanical system 100 in another position. It should be understood that FIGS. 1A-1B illustrate an exemplary embodiment of the system 100. As such, in other embodiments and implementations, the various parts of the system 100 can vary in size and dimension relative to the embodiment shown in FIGS. 1A-1B. In other words, the scale of FIGS. 1A-1B is not limiting of the present invention and it will be understood that certain parts in these figures can be larger or smaller than other parts and thus, the spatial and size relationship between the illustrated parts is not limiting of the teachings of the present invention.

With reference to FIGS. 1A-1B, the optical-mechanical system 100 can include a housing 110 that is defined by a first end that can contain a first end plate 112 and an opposite second end that is defined by a second end plate 114. A main housing part 120 can be disposed between the first end plate 112 and the second end plate 114. Each of the first and second end plates 112, 114 can be in the form of a circular plate and the main housing part 120 can have a cylindrical shape or can be formed by a number of axial supports 130 that connect to the first and second end plates 112, 114. More specifically, the axial supports 130 can be elongated structures that are spaced circumferentially apart and are connected at their ends to the first and second end plates 112, 114, respectively. In one embodiment, there can be a total of eight (8) axial supports 130 that are arranged circumferentially, such as at 45 degree intervals.

The optical-mechanical system 100 includes an energy source S that produces a coherent first energy beam 10. The energy source S is disposed at a geometric center of the first end plate 112. Any number of different energy sources S can be used so long as each is suitable for the intended application as described herein. In one embodiment, the energy source S produces a laser beam of predetermined wavelength. In one or more embodiments, the energy source S for producing the high energy laser can comprise an electric power source (e.g., battery or electric outlet) or any other suitable energy source. For example, the energy power source S can be a powered laser that operates and is powered by an electrical current or even another laser or other device.

The first energy beam 10 emitted from the energy source S travels along a path until the first energy beam 10 is split by a first beam splitter 140. The first beam splitter 140 splits the first energy beam 10 into a second beam 20 and a third beam 30.

The first beam splitter 140 is movably disposed along a first rail 150 so as to allow the position of the first beam splitter 140 to be altered. The first rail 150 is configured and positioned such that the first beam splitter 140 is capable of traveling at all times parallel and coincident to the first beam 10 and the second beam 20. The first rail 150 is thus an elongated structure to which the first beam splitter 140 is securely coupled in a manner in which the first beam splitter 140 can be moved axially. Since the energy source S and first beam splitter 140 are disposed along an axis that passes through the geometric center of the first end plate 112, the first rail 150 is disposed at an off-center location. The energy source S is also coupled to the first rail 150.

The first rail 150 thus allows the first beam splitter 140, as well as the energy source S, to move in an axial direction (e.g., slide in forward and backward directions).

It will also be appreciated that any number of techniques can be used to controllably move the first beam splitter 140 along the first rail 150. The energy source S is not coupled to the first beam splitter 140. The energy source S gets moved as a result of the motion of the first beam splitter 140 along the first rail 150. As a result of this optical-mechanical system and application of conservation of angular momentum to the energy beam, both the energy source S and the first beam splitter 140 travel axially along the first rail 150. For example, a motor can be operatively connected to the first beam splitter 140 to cause controlled movement thereof or the first beam splitter 140 can be manually adjusted.

The third beam 30 is forced to travel in a closed, equilateral triangular path, as an approximation of a circular path of initial radius, R1, by means of the optical-mechanical system 100 of the present application. Subsequently, the third beam 30 is forced to travel in closed equilateral triangular paths of decreasing radius by means of the optical-mechanical system 100.

Figure 1C:
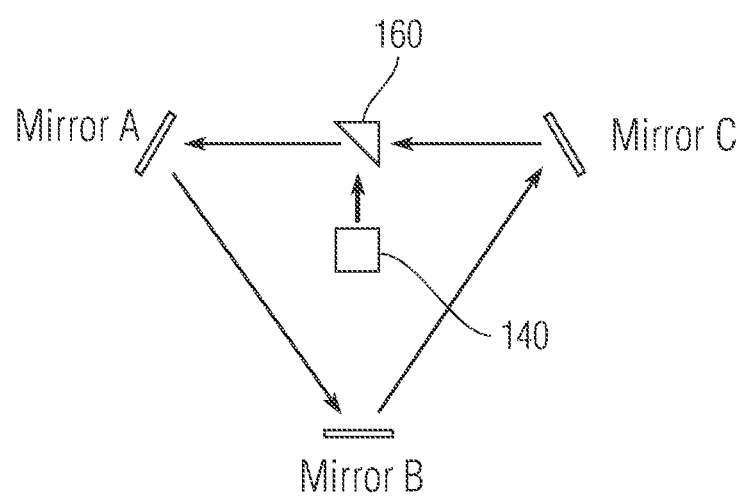
FIG. 1C illustrates the relative positioning of three mirrors of the optical-mechanical system in accordance with one or more embodiments.

The system 100 includes a second beam splitter 160 that is positioned on a separate second rail 170 and moves via an actuator (e.g., motor operatively coupled to the system 100) in synchrony with a mirror A, a mirror B, a mirror C and the first beam splitter 140. As such, the actuator (e.g., motor or the like powered by electric current from a battery or other energy source, such as an electric outlet, etc.) that moves the second beam splitter 160 can also act to move mirrors A, B, and C. Mirrors A, B and C are positioned on three rails 190, 191, 192, respectively, that are arranged to form an equilateral pyramid (see FIG. 1C). FIG. 2A shows the positioning of one of mirrors A, B, C on a respective rail 190, 191, 192 and FIG. 2B shows operation of the mirror and in particular shows an incident third beam 30 striking the mirror and then being reflected as a reflected beam 30.

Referring again to FIGS. 1A-1B, first ends of the three rails 190, 191, 192 are coupled to a first mirror substrate 194 and opposite second ends of the three rails 190, 191, 192 are anchored to a second mirror substrate 195 that is spaced from the first mirror substrate 194. The first and second mirror substrates 194, 195 are spaced apart from one another and can be in the form of (annular shaped) disks or can have other shapes. As discussed herein the position of the mirrors A, B, C on the respective rails 190, 191, 192 can be adjusted. The first mirror substrate 194 is coupled to the main housing 120 by a connector 199. The connector 199 can be in the form of at least one and preferably a plurality of supports (e.g., spokes) that extend radially outward from the first mirror substrate 194 to the main housing 120. The connector(s) 199 thus serve to suspend the first mirror substrate 194 within the main housing 120 at a fixed location.

The second mirror substrate 195 is coupled to the main housing 120 by a connector 197. The connector 197 can be in the form of at least one and preferably a plurality of supports (e.g., spokes) that extend radially outward from the second mirror substrate 195 to the main housing 120. The connector(s) 197 thus serve to suspend the second mirror substrate 195 within the main housing 120 at a fixed location.

The rails 190, 191, 192 are thus also fixedly coupled to the main housing 120 as a result of being coupled to the first mirror substrate 194 (e.g., the first ends of the rails 190, 191, 192 are preferably coupled about a periphery of the substrate 194). It will be appreciated that the first mirror substrate 194 can be annular shaped so as to allow the rail 150 to pass through an opening formed therein, whereby the first beam splitter 140 is permitted movement through this opening if desired. Similarly, the second mirror substrate 195 can have an annular shape so as to allow the second beam 20 to pass therethrough, as shown, and the second end plate 114 also includes a coaxially aligned opening to also allow the second beam 20 to pass therethrough.

The system 100 includes a third beam splitter 180 which is a beam splitter that is positioned at one end of the system 100 to recombine the second beam 20 with the third beam 30. The third beam splitter 180 functions in this way only when the first beam splitter 140 travels a specific distance corresponding to a shrunken orbit of desired radius as shown in the figures.

The second beam splitter 160 serves to direct the third beam 30 to mirror A, which then directs the third beam 30 to mirror B, which in turn directs the third beam 30 to mirror C, which is positioned and configured to redirect the third beam 30 back to mirror A for all positions of the first beam splitter 140.

It will be appreciated that mirrors A, B, and C form the equilateral triangle-shaped path followed by the high energy laser light beam, the third beam 30, that is the approximation for a circular path for all positions of the first beam splitter 140.

The third beam 30 strikes the second beam splitter 160, then travels, in sequence, to mirrors A, B and C, forming a closed triangular loop (an approximation of a circular orbit).

Mirrors A, B, C move in synchrony with the first beam splitter 140 by means of linear actuators, for example, such that the closed triangular light path is always parallel to and in the same plane as the third beam 30. FIG. 1A shows the first beam splitter 140, second beam splitter 150, mirror A, mirror B, and mirror C in two different positions, namely, one in which the components are closer to the support 194 and the other in which they are closer to the support 195. FIG. 1B shows the first beam splitter 140, second beam splitter 150, mirror A, mirror B, and mirror C in yet another different position.

As the first beam splitter 140 is moved away from energy source, source S, by means of a linear actuator moving in synchrony with mirrors A, B, and C, and the second beam splitter 160, the radius of the closed loop, formed by the third beam 30 reflected, in sequence, from mirrors A, B and C, is reduced. FIG. 3A shows a closed triangular path having a small radius, while FIG. 3B shows a closed triangular path having a large radius.

The third beam 30 is traveling at the speed of light. Each orbit of the third beam 30 is an approximation of uniform circular motion.

The entire optical-mechanical system 100 is given a constant rotational motion by rotating the optical-mechanical system 100 via an electric motor (not shown). For example, the electric motor can have a drive shaft that is operatively coupled to the system 100 so as to impart rotation thereto. Thus, upon operation of the electric motor, the system 100, and in particular, the housing 110 thereof, is rotated at a select speed.

The second beam 20 continues in a straight path, while the third beam 30 travels in increasingly smaller triangular orbits. Thus, the third beam 30 travels a greater distance than the second beam 20. After reaching a specific, final radius, R2, (FIG. 4B) which is smaller than initial radius, R1, the third beam 30 is redirected to the second beam 20 by means of the third beam splitter 180. FIG. 4A shows a near-final radius of the system 100 which is realized prior to the final radius shown in FIG. 4B.

As shown in FIG. 4B, at the final radius, R2, the third beam 30 is plucked from its planar orbit by stationary mirror D, which directs it to stationary mirror E, which in turn directs it to stationary third beam splitter 180. The third beam splitter 180 recombines the third beam 30 with the second beam 20. Mirrors D and E are suspended relative to the three rails 190, 191, 192 described earlier configured to form an equilateral pyramid and on which mirrors A, B, and C reside. As shown in the figures, the mirror D and E can be fixedly attached to a support rod 201.

Conservation of angular momentum dictates that the speed of the third beam 30 increases as it travels in increasingly smaller circular orbits. However, because the speed of the third beam 30 is the speed of light, the universal constant, its speed at all radii is the same. As a result, upon combining the second and third beams 20, 30, coincident with the first beam 10, the energy source S must instantaneously undergo self-induced translational motion, in the opposite direction as the first beam 10 such that the average combined speed of it and the source beam (the first beam 10) up to the point of maximum radius, preserve conservation of angular momentum of the system.

Specifically, Angular Momentum, L, where $L=I\times w$, and I is moment of inertia, and w is angular velocity, is a function of the radius "r" of the orbit of the continuous, coherent high energy beam laser light ($L=f(r)$). This can be approximated by the following formula: $L \sim velocity \times r^2$, where r is the radius of the circular orbit of rotation. Equating the angular momentum of the laser light in a small orbit to its angular momentum in a large orbit, and substituting the speed of light ("c") for the velocity of the laser light beam in the above equation yields:

[velocity of laser light](small orbit)/[velocity of laser light and source](large orbit)=$r^2$(large orbit)/$r^2$ (small orbit), or $c$(small orbit)/[source velocity+$c$](large orbit)=$r^2$ (large orbit)/$r^2$(small orbit)

It will further be understood that the size of the optical-mechanical system 100 is scalable and a function of the desired size of the equilateral pyramid and the initial and final radius of the closed triangular path traversed by the third beam 30.

As exemplified by the embodiment discussed above, conservation of angular momentum applies to a continuous, coherent high energy beam, represented here by a laser light beam, traveling in a closed orbit. Appropriately applying conservation of angular momentum to laser light traveling in a closed orbit can cause controlled linear motion of an associated solid object. Said differently, by applying conservation of angular momentum to laser light beam using the above equations, one can induce motive force in a solid object (i.e., move the object) without relying on existing conventional motive force technology (e.g., combustion engines, electric motors, and stored energy sources) and at speeds approaching the speed of light. In one or more embodiments described herein, the solid object can be the high energy laser beam source (e.g., source S).

Further, in at least one embodiment, a group of optical-mechanical system 100 units can be arranged to operated in an orchestrated fashion to provide controlled motion the collective group of the optical-mechanical system 100 units, and in so doing, can serve as the propulsion engine of a manned or unmanned aerial vehicle or space transport vehicle, for example.

Accordingly, the present systems and methods provide a way to move a solid object using only laser light and a special configuration of mirrors and beam splitters. More specifically, it is a way to induce controlled linear motion of a solid object using only high energy laser beams instead of traditional agents of motive force. Here, the laser light source also serves as the solid object to be moved. The laser light is forced to mimic a spinning ice skater subject to conservation of angular momentum by the configuration of mirrors and beam splitters. For the purposes of initial and final 'skater' speed, the beam source plus the initial (large) laser light beam orbit, together, are treated as a system and represent the 'initial speed.' Similarly, the terminal (small) laser light beam orbit, alone, represents the 'final speed.' As the spinning skater pulls his outstretched arms closer and closer to his body (radius of his outstretched arms is reduced), his rotational speed increases. However, in the case of the present system, as the radius of the laser light is reduced, its speed remains the same given that the speed of light is universally constant. Thus, in order to conserve angular momentum, and because the laser light beam is continuous, as the laser light beam travels in smaller and smaller radii, its source, initially at rest, is forced to move along the rail in the opposite direction of the laser light beam and at an increasing speed approaching the speed of light. The theoretical terminal speed of the source is determined by the ratio of the initial and final radii of laser light orbits.

For example, assume the initial (large) radius of laser light orbit is 3 meters and the final (small) radius of laser light orbit is 1 meter. Then, $c$(small orbit)/[source speed+$c$(large orbit)](large orbit)=$r^2$(large orbit)/$r^2$(small orbit)

$c$(small orbit)/[source speed+$c$(large orbit)](large orbit)=$3^2$(large orbit)/$1^2$(small orbit)=9

Thus, given universal constant speed of light, c, and given that beam source and initial radii of laser light beam function as a system, the theoretical terminal speed of the sources is:

$c$/source speed+$c$=9

1/source speed+$c$=9/$c$ (9×source speed)+9$c$=1$c$

9×source speed=−8$c$

Source speed=−⁸⁄₉$c$.

In other words, the source must move in the opposite direction of the laser beam and approach a speed equal to ⁸⁄₉ that of the speed of light.

An object's speed as a fraction of the speed of light may be controlled by ratio of radii, as shown in the above equation. Specifically, the greater the radius of the numerator (r2, the larger radius) versus the radius of the denominator (r1, the smaller radius), the greater the fraction of the two radii, and thus the greater the object's speed as a fraction of the speed of light.

As discussed in the above embodiments and as shown in FIGS. 1-4, a closed orbit of laser light defined by a closed triangular path can approximate closed circular path. In at least one embodiment, a fiber optic cable can be used in the place of the mirrors to more precisely approximate a closed circular path. More specifically, in at least one embodiment, a fiber optic cable can be arranged to create a closer approximation to circular orbit and replicate the optical-mechanical configuration exemplified in FIGS. 1-4, and allow for a reduction in the number of optical components, in particular, mirrors, beam splitters, and traction mechanism to move the beam splitter. As a result, an embodiment that utilizes a fiber optic cable can allow for a simpler, more robust device.

FIG. 5 shows an exemplary embodiment of the system 100 featuring a fiber optic cable 500. As shown in FIG. 5, the coil of the fiber optic cable can be in helical formation of decreasing radius and tightly wound around a central axis to form the shape of a flat cone. An embodiment using a fiber optic cable functions in a similar way as the previously discussed embodiment, with certain modifications. For example, in the embodiment shown in FIGS. 1A-1B, the system features moveable beam splitters 140 and 160. In the embodiment of FIG. 5, however, the beam splitters 140 and 160 are stationary. With reference to FIG. 5, stationary beam splitter 160 serves as the entry point of third beam 30 to the fiber optic cable 500. Further, in an embodiment featuring a fiber optic cable as exemplified in FIG. 5, there are no mirrors A, B, and C, as the fiber optic cable 500 is arranged in the shape of a flat cone with each layer of fiber optic cable stacked on top of the immediate lower layer. Similar to the embodiment of FIGS. 1A-1B, in the embodiment exemplified in FIG. 5, the third beam 30 rejoins the second beam 20 via beam splitter 180, which is stationary. Due to the configuration of the fiber optic cable 500, there is also no need for mirrors D and E or support rod 201 (see FIGS. 1A-1B) in the embodiment of FIG. 5. The conservation of angular momentum, as shown by the above equations, remains the same for the embodiments featuring the fiber optic cable (e.g., FIG. 5), as does the speed and direction of the solid object (e.g., source S), which undergoes induced translational motion.

As mentioned above, system 100, as exemplified in FIG. 5, can be generally in the shape of a cone. The general cone shape of the system 100 is exemplified in FIG. 6, which shows the high energy beam emanates from the top and the energy beam source (solid object) rapidly moving in the opposite direction of the high energy beam. The high energy beam then moves along its track (rail 150) and emanates out of the base (tip) of the cone. Referring back to FIGS. 1A-1B, in one or more embodiments, the motion of the solid object (e.g., source S) can be controlled, in concert with the third beam 30, in such a way as to propel the entire optical-mechanical system 100 unit itself. In one or more embodiments, as exemplified in FIG. 6, a barrier plate 605 can be attached to the rail 150 to prevent lateral movement of the laser beam source S beyond a specific point.

When the system 100 is energized and operational, the barrier plate 605 can force the laser beam source's (S's) momentum to transfer to the high energy laser beam (third beam 30) as the Source S is prevented from moving (i.e., conservation of linear momentum). The added momentum to the third beam 30 enables the beam 30 to act as a propulsive force, moving the system in the opposite direction of the third beam 30. In embodiments in which several systems 100 are arranged in circular group via a circular frame (see FIG. 7), the group of systems can be similarly energized in an orchestrated manner, for example, in unison, such that the group of systems is propelled. The direction of the swivel of each system 100 in the group can be orchestrated to control the direction of movement of the group. Thus, the group of systems can also serve to propel a solid object, such as a manned or unmanned aerial vehicle. For example, the group of systems can make up at least a portion of the solid object (e.g., unmanned aerial vehicle), or can be operatively coupled to the solid object.

In order to propel the solid object, the system 100 or group of systems must generate a propulsive force that is sufficient to overcome the forces acting on the solid object, such as its gravitational force. For example, in order for the system 100 or a group of systems to propel an unmanned aerial vehicle, the propulsive force generated by the system or systems 100 must overcome the gravitational force of the unmanned aerial vehicle and any payload that the unmanned aerial vehicle is configured to carry.

In one or more embodiments, as shown in FIG. 7, a group of optical-mechanical systems 100 (e.g., the system exemplified by FIGS. 1A-1B and/or FIG. 5) can be arranged to operate in an orchestrated fashion to provide controlled motion for the collective group of systems 100. In so doing, in one or more implementations, the group of systems 100 can serve as a propulsion engine of a solid object, such as a manned or unmanned aerial transport vehicle, for example.

As shown in FIG. 7, in one or more embodiments the group of systems 100 can be arranged in a circle, with the wide portion of the "cone" shape of each system facing up, and the narrow portion of the "cone" shape of each system facing down. For instance, the systems 100 can each be attached to a circular frame 705 via a gimbal 710 so that each system 100 can swivel. The ability to swivel each system in the group allows the high energy laser beam emanating from each system to be deliberately pointed in a particular direction. As such, by directing the beam of each system 100 of the group to be pointed in a particular direction, the movement of the entire group of systems can be controlled (i.e., the group of systems will move in the opposite direction from that of the beams of each system). As mentioned above, the group of systems can make up at least a portion of a solid object (e.g., unmanned aerial vehicle), or can be operatively coupled to that solid object. Thus, by directing the beams of each system 100 in the group, the group of systems can also control the direction of movement of the solid object, which would be in the opposite direction of the direction of the beam of each system 100.

Accordingly, the present systems provide ways to induce controlled, linear (translational) motion in an object (a mass) solely using a specific configuration of a continuous, high energy coherent laser light beam emanating from the object itself. The object (here, represented by a laser light beam source) is not moved by any internal or physically connected motor, combustion engine, or stored energy source, nor any externally applied force. Thus, this translational motion, via a new, non-combustion-based, non-electrical energy source and based on a high energy (laser light) beam configured in an optical-mechanical system, exploits conservation of angular momentum and thus offers a massive mechanical advantage over conventional motive force technology. A small input translation of a specifically configured beam splitter, a) instantaneously induces translation of the beam energy source by virtue of the optical-mechanical system alone; and b) at a speed that is orders of magnitude greater than the speed of the input translation speed of the first beam splitter.

It will be understood that the teachings of FIG. 7 can be embodied and applied to a number of different settings and application including but not limited to objects that are propelled through the air, such as an unmanned aerial vehicle (drone). In particular, the plurality of systems 100 can be part of a drone and operation of the system 100 in the manner described herein results in propulsion of the drone much like a traditional drone relies upon motored propellers to create lift (thrust action). It will also be appreciated that the output (e.g., emitted beam) of the systems 100 are discharged from the drone and directed outward into the air. It will be appreciated that the teachings of the present invention can be implemented into other masses that are propelled through air and also to masses that are propelled over land and water, etc. For example, a floatable device, such as a boat or the like, that is propelled across the water surface by implementing the teachings disclosed herein.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. An optical-mechanical system comprising:
   a rotatable housing;
   an axially movable high energy laser light source coupled to the rotatable housing and configured to emit a first light beam along a first path;
   a first axially movable first beam splitter disposed along the first path for splitting the first light beam into a second light beam and a third light beam; and
   a means for causing the third light beam to travel in an equilateral triangular path, as an approximation of a circular path of initial radius RI, and of decreasing radius, the means comprising: a second axially movable beam splitter, a first axially movable mirror, a second axially movable mirror, and a third axially movable mirror that are configured to move in synchrony with the second axially movable beam splitter, the axially movable first mirror, the axially movable second mirror and the axially movable third mirror being arranged to define an equilateral triangle, and a third beam splitter disposed at one end of the rotatable housing and configured to recombine the second light beam with the third light beam after the first axially movable beam splitter travels a predefined axial distance corresponding to a shrunken orbit of a desired radius.

2. The optical-mechanical system of claim 1, wherein the first axially movable mirror travels along a first rail, the second axially movable mirror travels along a second rail and the third axially movable mirror travels along a third rail, the first rail, the second rail and the third rail being oriented such that the first rail, the second rail and the third rail taper inwardly and converge toward one another in a direction toward the third beam splitter.

3. The optical-mechanical system of claim 1, wherein each of the second axially movable beam splitter, the first axially movable mirror, the second axially movable mirror and the third axially movable mirror move axially along a respective rail that is coupled to the rotatable housing.

4. The optical-mechanical system of claim 1, further including an electric motor operatively coupled to the rotatable housing.

5. The optical-mechanical system of claim 1, wherein the second axially movable beam splitter, the first axially movable mirror, the second axially movable mirror, and the third axially movable mirror are operatively coupled to linear actuators for controllably moving the second axially movable beam splitter, the first axially movable mirror, the second axially movable mirror, and the third axially movable mirror in a controlled linear manner and in synchrony.

6. The optical-mechanical system of claim 1, wherein the first axially movable beam splitter is disposed at a center of the rotatable housing and the first axially movable mirror, the second axially movable mirror and the third axially movable mirror are all disposed at a same radial distance from the first axially movable beam splitter.

7. The optical-mechanical system of claim 1, wherein synchronized linear movement of the first axially movable beam splitter, the first axially movable mirror, the second axially movable mirror and the third axially movable mirror result in the third light beam traveling along progressively shrinking orbits.

8. The optical-mechanical system of claim 1, further including a fixed fourth mirror and a fixed fifth mirror that are arranged such that when the first axially movable beam splitter travels the predefined axial distance, the third light beam contacts the fixed fourth mirror which directs the third light beam to the fixed fifth mirror which in turn directs the third light beam to the third beam splitter.

9. The optical-mechanical system of claim 1, wherein the first axially movable beam splitter moves parallel and coincident to the first light beam and the second light beam.

10. A method of controlled self-propulsion by a laser energy beam source via application of conservation of angular momentum comprising the steps of:
    rotating a housing that is associated with an optical-mechanism system, the housing including the laser energy beam source that emits a first light beam;
    splitting the first light beam with a first beam splitter into a second light beam and a third light beam, the first beam splitter being axially movable along a first axis;
    using an axially movable first optical arrangement to direct the third light beam to travel in an equilateral triangular path that approximates a circular orbit defined by a circular orbit radius, the axially movable first optic arrangement including a second beam splitter and a first mirror, a second mirror and a third mirror;
    causing the third light beam to travel in shrinking orbits defined by equilateral paths; and
    after reaching a desired final radius which is less than an initial radius, recombining the third light beam with the second light beam by redirecting the third light beam to the second light beam with a fixed second optical arrangement including a third mirror and a fourth mirror and a third beam splitter.

11. The method of claim 10, wherein the laser energy beam source is movable along the first axis.

12. The method of claim 10, wherein the second beam splitter and the first mirror, the second mirror and the third mirror move in synchrony.

13. The method of claim 10, wherein the first mirror travels along a first rail, the second mirror travels along a second rail and the third mirror travels along a third rail, the first rail, the second rail and the third rail being oriented to form an equilateral pyramid.

14. An optical mechanical system for controlled movement of a solid object, comprising:
    a rotatable housing;
    an axially movable high energy laser light source coupled to the rotatable housing and configured to emit a first light beam along a first path;
    a stationary first beam splitter disposed along the first path for splitting the first light beam into a second light beam and a third light beam; and
    a means for causing the third light beam to travel in a first path, as an approximation of a circular path of initial radius RI, and of decreasing radius, the means comprising: a stationary second beam splitter, a fiber optic cable along which the third light beam travels, the fiber optic cable being arranged in a helical shape, and a stationary third beam splitter disposed at one end of the rotatable housing and configured to recombine the second light beam with the third light beam;
    wherein the optical mechanical system causes the axially movable high energy laser light source to move axially opposite a direction of the first light beam.

15. A system for controlled movement of a solid object, comprising:
    a group of optical mechanical systems, wherein the group of optical mechanical systems makes up at least a portion of the solid object, each optical mechanical system of the group of optical mechanical systems comprising:

a rotatable housing;

an axially movable high energy laser light source coupled to the rotatable housing and configured to emit a first light beam along a first path;

a stationary first beam splitter disposed along the first path for splitting the first light beam into a second light beam and a third light beam; and a means for causing the third light beam to travel in another path which is as an approximation of a circular path of initial radius RI, and of decreasing radius, the means comprising:

a stationary second beam splitter, a fiber optic cable along which the third light beam travels, the fiber optic cable being arranged in a helical shape, and a stationary third beam splitter disposed at one end of the rotatable housing and configured to recombine the second light beam with the third light beam;

wherein the system causes the axially movable high energy laser light source to move axially opposite a beam direction of the first light beam, and wherein the group of optical mechanical systems is arranged in a circular formation, wherein each optical mechanical system of the group of optical mechanical systems further comprises:

a respective gimbal;

wherein each respective gimbal is operatively connected to a circular frame, whereby each optical mechanical system of the group of optical mechanical systems can selectively rotate about the respective gimbal; and wherein each optical mechanical system in the group of optical mechanical systems can be rotated in unison in a selected direction to control a movement direction of the solid object.

16. The system of claim 15, wherein the solid object is an unmanned aerial vehicle.

\* \* \* \* \*